United States Patent [19]
Childers

[11] 3,766,435
[45] Oct. 16, 1973

[54] SAFETY CIRCUIT
[76] Inventor: Kennie Childers, Box 251, Gary, W. Va. 24836
[22] Filed: Jan. 15, 1973
[21] Appl. No.: 323,701

[52] U.S. Cl. .................. 317/18 A, 317/53, 340/255
[51] Int. Cl. ............................................. H02h 3/16
[58] Field of Search ............ 317/18 R, 18 A, 18 C, 317/9 A, 9 D, 31, 53; 340/255

[56] References Cited
UNITED STATES PATENTS
| | | | |
|---|---|---|---|
| 3,243,657 | 3/1966 | Towles | 317/18 A |
| 3,515,941 | 6/1970 | Moore | 317/18 A |
| 3,243,658 | 3/1966 | Blackburn | 317/18 A |

Primary Examiner—J. D. Miller
Assistant Examiner—Harvey Fendelman
Attorney—John W. Malley et al.

[57] ABSTRACT

The safety circuit protects against ground fault hazards in a direct current machine actuated from a D. C. source and incorporates means for detecting current flow from each of positive and negative legs of the D. C. lines to ground, either simultaneously or individually, and provides an indication thereof. Interrupting means responsive to the detector indication disconnects the machine from the power source upon the occurrence of the ground fault. The circuit also provides protection against overloads.

13 Claims, 2 Drawing Figures

3,766,435

SAFETY CIRCUIT

BACKGROUND OF THE INVENTION

Field of Use

The invention herein relates to safety circuits, and particularly to ground fault detecting circuits when used with D. C. apparatus.

2. Description of the Prior Art

In order to detect the occurrence of a ground fault in electrically operated machinery, a number of prior art schemes have been developed which accomplish ground fault detection with some degree of success. An important factor in the accurate and swift detection of a ground fault is the requirement that the system operate in a safe manner, thereby not adding to the shock hazard because of the very existence of the safety circuit itself. Furthermore, if a safety circuit does not operate properly, it may add substantial danger to the already high risks of working with high-power machinery since the operator may feel confident that the safety system is operative and, therefore, expose himself to greater dangers when utilizing the machinery. In coal mining operations, for example, it is a requirement that machinery used within a mine be safe from ground faults between internal circuitry of the machinery and portions exposed to the operator or areas where a fault might develop since, in addition to shock hazards, noxious and explosive gases may be present in the mine and may be set off by the occurrence of a ground fault manifested as a spark breakdown.

While there have been provided in the prior art many types of ground detection apparatus, each suffers from shortcomings due to the fact that it may not be able to detect a positive and a negative fault simultaneously or that overloads may not be detected and the normally safe portions of the machinery housing and the like may become hot with electrical energy due to such overloads and ground faults. Furthermore, the sensitivity of such devices must be regulated so that under various circumstances the hazards may be minimized.

It is, therefore, an object of the present invention to provide a system which obviates one or more of the disadvantages and limitations of the described prior arrangements.

It is another object of the present invention to provide a system which detects both positive and negative ground faults either individually or simultaneously.

It is yet another object of the present invention to provide a system which has adjustable sensitivity for varying conditions and situations.

It is still another object of the present invention to provide a system wherein an overload will cause an interruption in the power supply thereby obviating a dangerous condition resulting therefrom.

SUMMARY OF THE INVENTION

There has been provided a safety circuit for detecting ground faults in a direct current machine actuated from a D. C. input. Means, coupled across the lines, detect current flow from each of the positive and negative legs of the lines to ground occurring both simultaneously and individually, and provide an indication of current flow. Means responsive to the detector indication interrupts the input power source to the machine, thereby obviating the shock hazard in the apparatus.

For a better understanding of the present invention, together with other and further objects thereof, reference is directed to the accompanying drawing, taken in connection with the following description, the scope of which will be pointed out in the appended claims.

DESCRIPTION OF THE PREFERRED EMBODIMENT

Figure 1:
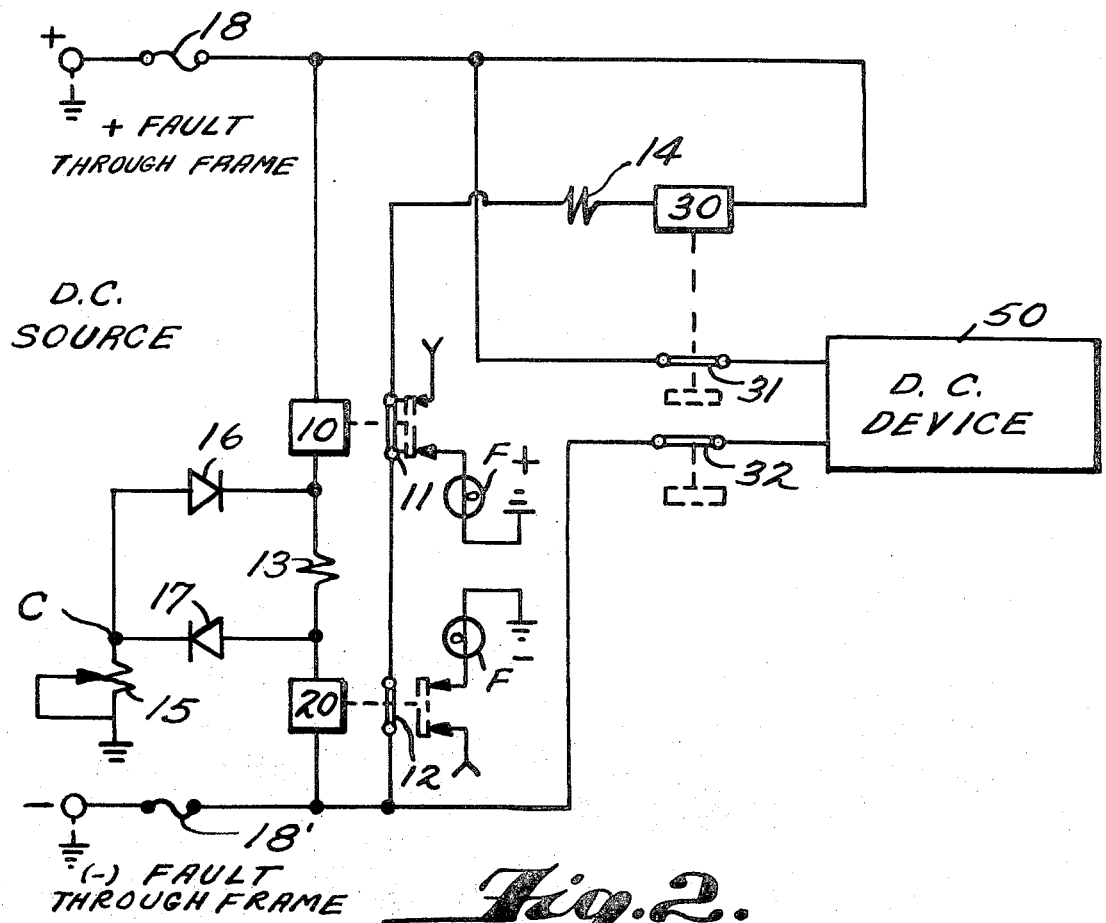
FIG. 1 is a schematic view of the safety circuit of the present invention.

In FIG. 1, there is shown the safety circuit for controlling power input from a D. C. device 50 which may be any of a plurality of D. C. machines operated from a conventional D. C. source. It should be understood that the D. C. source may be fed by an A. C. supply which is suitably rectified. Such a system will be described hereafter in the specification with respect to FIG. 2.

In the circuit of FIG. 1, there is shown a D. C. source appropriately identified by positive and negative terminals, each of which is respectively coupled through a fuse 18 and 18' and contactors 31 and 32 to the D. C. device 50. The contactors 31 and 32 are normally closed and held in that position by a normally energized relay 30 which receives power in this particular embodiment by a circuit extending from the negative (−) terminal through the fuse 18', serially coupled switches 12 and 11, resistor 14, relay 30, and then through fuse 18 to the positive (+) terminal.

Further, the switches 11 and 12 are normally held in a closed position by their respective, normally energized relays 10 and 20. These relays, having a load resistor 13 disposed therebetween, are connected in series with fuses 18 and 18' across the D. C. source.

Further, in the circuit there are included a pair of diodes 16 and 17 connected in series across resistor 13, the cathode of diode 16 being coupled to the more positive side of resistor 13 while the anode of diode 17 is coupled to the more negative terminal thereof. The diodes 16 and 17 have a common junction C from which a potentiometer 15 is coupled to ground.

The dotted ground symbols coupled to each of the positive and negative terminals and labelled as (+) fault and (−) fault indicate illustratively the existence of a fault in the circuit. Each will be described further in the specification.

The circuit of the present invention operates as follows:

Under normal conditions, with no ground fault existing in the circuitry, power is supplied from the positive terminal (+) through fuse 18 and contactor 31 to the device 50 and thence through contactor 32 and fuse 18' to the negative terminal (−). If either of the contactors 31 or 32 becomes open circuited, the device 50 is deenergized. It should be understood that contactors 31 and 32 may be coupled at any appropriate place between the device and the positive and negative terminals so as to interrupt power for the entire system if necessary. The illustration at the position shown, is by way of example, and any convenient and logical location for deactivating the power input to the machine is advisable. Further, it should be understood that the device 50 may be mounted on a steel or iron frame member in which ground currents may flow and it is the purpose of the invention herein to detect such current and thereby disconnect the machine from power so as to cause immediate cessation of said ground currents.

Each of the relays 10 and 20 is of the fusible type, meaning that if an excess current flows through the circuit, the relays will fuse, causing their respective contactors 11 and 12 to open. This deenergizes relay 30 causing contactors 31 and 32 to open thereby disconnecting device 50 from the power source. This is an additional benefit of the particular configuration of the present invention.

As noted before, the circuit of FIG. 1 includes the diodes 16 and 17, the function of which now will be described in connection with a description of how the circuit operates when ground faults occur.

A positive fault, represented by the appropriately labelled dotted ground symbol coupled to the positive terminal, causes ground current to flow from the positive terminal through the frame (not shown) to ground. The current path continues through resistive potentiometer 15 which is adjustable so as to control the sensitivity of the relays 10 and 20. From potentiometer 15, current flows through the diode 16 and thence through resistor 13, relay 20 and fuse 18' to the negative terminal (−). Under these circumstances, the relay 10 becomes de-energized, and when the potential across the relay falls below its dropaway voltage, the contactor 11 opens to interrupt the circuit to the relay 30 to cause relay 30 to drop out and contacts 31 and 32 to open. The D. C. device 50 thereby is deactivated.

Similarly, if a negative ground fault occurs, as is shown schematically in FIG. 1 by the dotted line from the negative terminal, current flows from the negative terminal (−) through the frame to ground and thence through the potentiometer 15, diode 17, resistor 13, relay 10 and fuse 18 to the positive terminal (+). Relay 20 is thereby de-energized and contactor 12 opens so as to deenergize the main relay switch 30. Thus, as previously explained, opens contacts 31 and 32 to deactivate the D. C. device 50.

Obviously, if a simultaneous double ground fault occurs, both relays 10 and 20 become de-energized, since the potential across each of the respective relays falls below that required to maintain it energized.

As stated previously, in the event of an overload, a surge of current flowing through either of the relays 20 or 10 will cause the relays to fuse and thereby open contactors 11 and 12. Furthermore, should either of the diodes 16 and 17 become short-circuited, one of the relays 20 or 10 will fuse and thereby drop out its respective contactors.

It should be understood that the arrangement of resistor 13 and diodes 16 and 17 permit one to determine whether a positive or negative fault exists. For example, if a light is suitably coupled to contactor 11 as shown in the drawing, then the F(+) lamp indicates a positive fault when contactor 11 is in the open position. Similarly, if a negative fault occurs causing the opening of contact 12, the F(−) lamp is activated thus indicating a negative fault. This feature may be utilized in trouble shooting the apparatus when the D. C. device shuts down.

Figure 2:
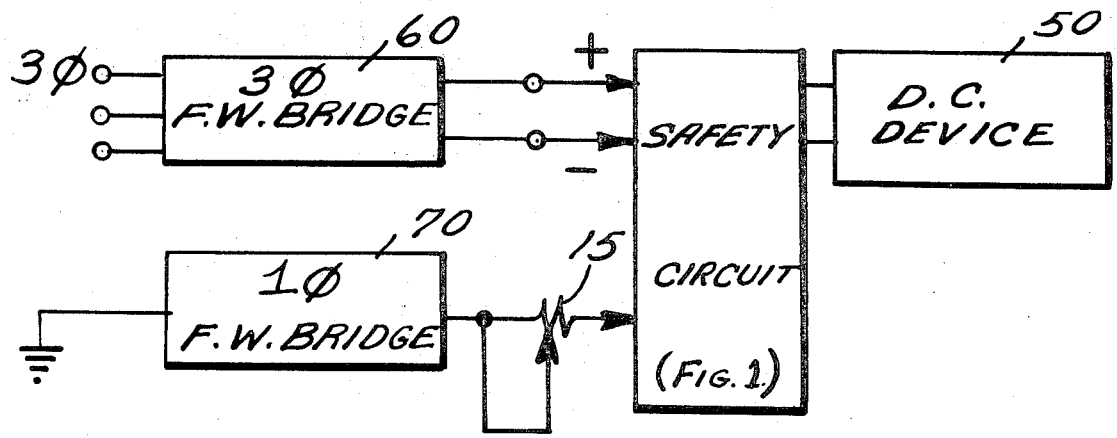
FIG. 2 is a modified version of the circuit shown in FIG. 1.

FIG. 2 shows a variation of the circuit of FIG. 1 wherein a three-phase full wave bridge 60 is utilized for supplying the positive and negative terminals of the circuit of FIG. 1. A single phase full wave bridge 70 is interposed between the sensitivity adjusting potentiometer 15 (see also FIG. 1) and ground so that any alternating components of ground fault currents are rectified and then coupled to the safety circuit of FIG. 1. Instead of a single phase full wave bridge 70, a capacitor may be used, but the sensitivity of such a system is limited by a high ripple factor and is not as preferable as the bridge 70.

While there has been described what is presently considered to be the preferred embodiment of the present invention, it will be obvious to those skilled in the art, that various changes and modifications may be made therein, without departing from the invention, and it is, therefore, aimed in the appended claims, to cover any and all such changes and modifications, as fall within the true spirit and scope of the invention.

What is claimed is:

1. An arrangement for detecting positive and negative ground faults in a D. C. circuit, comprising:
   a D. C. source applied to positive and negative terminals;
   a device operable upon application of D. C. thereto;
   a first circuit connecting said positive terminal to the device;
   a second circuit connecting said negative terminal to the device;
   a first interrupting means in at least one of said first and second circuits;
   a third circuit interconnected between said first and second circuits, said third circuit including second and third interrupting means and further including means for operating said first interrupting means;
   a fourth circuit interconnected between said first and second circuits and including separate means for respectively operating said second and third interrupting means; and
   circuit means interconnected with said fourth circuit and responsive to the presence of positive and negative ground faults, occurring both individually and simultaneously, to control current flow through said separate operating means thereby selectively actuating the second and third interrupting means to in turn control current flow through the operating means in said third circuit thereby actuating the first interrupting means to disconnect said device from the D. C. source.

2. An arrangement as set forth in claim 1, further comprising:
   separate indicating means, operatively related to said second and third interrupting means, for supplying an indication of the existence of a ground fault upon actuation of the respective interruption means.

3. An arrangement as set forth in claim 1, wherein said interrupting means comprise relay contactors and the operating means comprise relays.

4. An arrangement as set forth in claim 3, wherein said relays are of the fusible type.

5. An arrangement as set forth in claim 3, wherein said fourth circuit includes a pair of relays connected in series with, and separated by, a resistor; and wherein the circuit means interconnected with the fourth circuit includes a pair of series-joined diodes connected in parallel with the resistor and being oppositely poled with respect thereto, the junction between the diodes being electrically connected to ground.

6. An arrangement as set forth in claim 5, wherein the electrical connection of the diode junction to ground includes a variable resistor.

7. An arrangement as set forth in claim 6, wherein said relays are of the fusible type.

8. An arrangement as set forth in claim 7, further including:
separate indicating means, operatively related to the contactors which comprise the second and third interrupting means, for supplying an indication of the existence of a ground fault upon actuation of the respective contactor.

9. A safety circuit for detecting ground faults in a device actuated from D. C. input lines, comprising:
detector means for detecting current flow from each of positive and negative legs of the lines to ground occurring both simultaneously and individually and providing indication thereof including:
two serially coupled relays across the lines from positive to negative and a current limiting resistor interposed therebetween;
two diodes coupled in parallel in opposite polarities each at an end of the current limiting resistor, the diodes being commonly connected together at the other ends, and a sensitivity potentiometer coupled between ground and the common connection of the diodes;
each of the relays have at least one associated contact serially coupled together, controlled thereby to remain normally closed due to normal energization of the relays; the indication of a ground fault occurring when at least one of said relays becomes de-energized, opening its associated contact; and
an interrupter means responsive to the detector means indication for interrupting input power to the device in response to the detection of a ground fault including:
a main relay coupled with and responsive to the serially coupled relay contacts, said main relay and serial contacts coupled between the positive and negative lines for completing a circuit and establishing said main relay normally energized; and normally closed contacts for each leg of the power input controlled by the main relay for simultaneously decoupling the device from power whenever the main relay is de-energized due to an indication of said detector means.

10. The safety circuit of claim 9, wherein said interrupter means includes a serially coupled resistor for establishing a current limit in the interrupter circuit.

11. The safety circuit of claim 10, wherein each of said relays are of the fusible type such that an overload of current in any of the respective circuits results in any of said normally closed contacts becoming open circuited to thereby decouple the device from power.

12. The safety circuit of claim 10, further including:
indication means responsive to the respective relay contacts of the detector circuit for providing respective indication of both positive and negative ground faults, said indication means including light-emitting means energized in response to the respective positive and negative fault.

13. The safety circuit of claim 12, wherein the light emitting means is coupled thrugh a respective back contact of said detector relay.

* * * * *